United States Patent [19]
Tatsumi et al.

[11] Patent Number: 5,432,897
[45] Date of Patent: Jul. 11, 1995

[54] METHOD AND AN APPARATUS FOR EDITING TREE STRUCTURES IN DISPLAY

[75] Inventors: Tetsu Tatsumi, Sagamihara; Toru Yamaguchi; Minoru Ebisawa, both of Tokyo, all of Japan

[73] Assignee: Nippon Steel Corporation, Tokyo, Japan

[21] Appl. No.: 53,139

[22] Filed: Apr. 29, 1993

[30] Foreign Application Priority Data

Apr. 30, 1992 [JP] Japan .................................. 4-138004

[51] Int. Cl.⁶ .............................................. G06T 11/60
[52] U.S. Cl. .................................... 395/140; 395/133; 395/147; 395/161
[58] Field of Search .................. 395/59, 161, 133, 155, 395/156, 160, 140, 141, 143, 145–147, 161, 134–139

[56] References Cited

U.S. PATENT DOCUMENTS 4,785,408  11/1988  Britton et al. .
4,891,766   1/1990  Derr et al. .
5,167,011  11/1992  Priest ..................................... 395/54
5,168,554  12/1992  Luke ..................................... 395/161

FOREIGN PATENT DOCUMENTS 2-202620  8/1990  Japan ............................ G06F 3/14

OTHER PUBLICATIONS

The Windowing Environment, Nexpert Object pp. 24, 25, Nuron Data Company.

*Primary Examiner*—Almis R. Jankus
*Attorney, Agent, or Firm*—Pollock, Vande Sande & Priddy

[57] ABSTRACT

A method and an apparatus for editing displayed tree structures allows movement and connection of a moving object in the tree structure to an aimed object with a reduced number of operational steps and displays the moving object on a display unit in order to facilitate the work of an operator who edits tree structures. The apparatus for editing tree structures has a memory for storing tree structure information, an operation unit for inputting operational information including selection, separation, move and connection of an object displayed on a screen of the display unit, a coordinate computing device for computing coordinates on the screen in accordance with operational information, a searching device for retrieving an object which can be a parent of a moving object, a tree structure editing device for renewing the tree structure information stored in the memory and editing tree structures in accordance with inputted operational information and a display drive unit for generating a pattern displaying tree structures after editing and displaying the pattern on the display unit.

10 Claims, 8 Drawing Sheets

METHOD AND AN APPARATUS FOR EDITING TREE STRUCTURES IN DISPLAY

BACKGROUND OF THE INVENTION

1. Field of the Invention

The present invention relates to an improved apparatus for editing tree structures in display. The tree structures consisting of a plurality of objects and lines connecting respective objects to one another and displayed on a screen of display means.

2. Description of the Related Art

A tree structure or a directed tree is a directed graph which has no closed circuit, and only one node called root forming no end point of any branch with all nodes other than the root each having an end point of only one branch.

The tree structures have been heretofore used for expressing dependency relationship, inheritance relationship or the like among various objects. In other words, dependency relationship, inheritance relationship or the like is expressed by branches with the objects as nodes. An apparatus for editing displayed tree structures is an apparatus for displaying the tree structures on a screen and for executing deletion, creation, addition, move or the like of the objects in the trees interactively by using an electronic computer.

In such an apparatus for editing displayed tree structures, an operation as described in following items (1) or (2) has been heretofore implemented when move of an object is performed.

(1) First, an operator selects an object which is desired to be moved, then the computer copies the indication of this object in a buffer on a memory and deletes the object indication from the screen at the same time. Next, the operator selects a desired destination, then the computer pastes the object indication copied in the buffer on the memory at the destination. (As disclosed, for example, in Nexpert Object provided by Nuron Data Company.)

(2) First, an operator selects an object desired to be moved and a branch connected to its parent object, then the computer deletes them. Thereafter, the object is connected to a parent object at the desired destination by means of a branch. (As shown in JP-A-2-202620).

In the operation in the item (1) described above, however, the object desired to be moved is erased once from the screen. Therefore, the operator has to remember which object is being presently moved, thus compelling excessive burden in continuing an intellectual work.

Further, although the object during move is always displayed on a screen in the operation in the item (2) described above, it is required to repeat deletions and drawings of branches by the number of moving objects in case a plurality of objects are moved to one different parent, thus still requiring an excessive intellectual work.

SUMMARY OF THE INVENTION

An object of the present invention is to provide an apparatus for editing displayed tree structures in display which is able to realize move of objects having tree structures on a screen in a small number of procedures and to lighten a burden on an operator.

In order to achieve the above-described object, a present invention method of editing displayed tree structures composed of a plurality of objects and branches for connecting respective objects to others is characterized in that information on the tree structures is stored in a memory; the tree structures are displayed on a display screen; once an object for separation is selected, the selected object is displayed in distinction from others; a single object possible to be a parent which is located at a position, for example closest to the selected object being moved is retrieved; a connecting line connecting the possible parent object and the object is displayed; when the parent object to be connected is determined, tree structure information is edited based on the objective object and the parent object and a record of the tree structure information is renewed based on the result of editing; and new tree structures are displayed.

Further, an apparatus for editing tree structures in display according to a first aspect of the present invention comprises a display unit for displaying tree structures on a display screen, a memory for storing information on the tree structures, an operation unit for inputting operational information including selection, separation, move and connection to other objects of a selected object which becomes an object for operation, a coordinate computing unit for computing coordinates on a screen in accordance with the inputted operational information, a retrieval unit for retrieving one parent object which can be a parent of the selected object, an editing unit for editing tree structure information stored in the memory corresponding to inputted operational information based on computed coordinates and renewing stored tree structure information based on edited results, and a display drive unit for having information on the retrieved parent object and connecting line between the selected object and the parent object in accordance with editing steps displayed on the display unit.

Furthermore, an apparatus for editing displayed tree structures according to a second aspect of the present invention comprises menu display means for displaying an operation menu expressing operational information on a display screen, operation means for selectively inputting operational information based on the displayed operation menu and connection means for generating information on a connection line connecting an index indicating the position of the coordinates on the screen and the separated object to each other, in place of the operation unit for inputting operational information of the first apparatus for editing displayed tree structures.

According to the method of the present invention, tree structures composed of a plurality of objects and branches connecting the objects to others are displayed on a display screen, the display of the objects does not disappear from the screen but moves on the screen in accordance with the instruction of an operator when any object is to be moved and connected to another parent object, associated with branches being connected to a possible parent object to be connected, or branches connecting to a pointer for designating a parent object, and furthermore, when the parent object to be connected is determined, tree structures after editing are rearranged and displayed on the display screen again. Accordingly, the operator who edits the tree structures needs not to remember the object during move, and the labor of deletion and connection of branches may also be saved.

According to the first apparatus for editing displayed tree structures of the present invention, the operator operates operation means so as to input operational information including selection, separation, move and connection to other object of respective objects on the screen of the display means in case of connection of a certain object to other object based on tree structures consisting of a plurality of objects and branches for connecting respective objects to others displayed on the screen of the display means. The coordinate computing means computes coordinates on a screen in accordance with operational information from the operation means and sends the computed information of the coordinates to the tree structure editing means. Further, the retrieval means retrieves, while the object is being moved, one object which has possibility to be a parent of the moving object. The tree structure editing means edits tree structure information related to selection, separation, move and connection to other object from respective objects corresponding to the operational information and based on the information computed by the coordinate computing means. Then, the tree structure information stored in the storage means is renewed based on the editing corresponding to the operational information inputted by the operator. The display drive means generates display pattern information in accordance with the editing status of the tree structure editing means such as a state of selection, a state of separation, a state in move and a state of connection to other object, and presents the display pattern information for display by the display means. At least, the display drive means generates display pattern information for connecting the memory object to the parent object retrieved by the retrieval means with a line during move and presents the display pattern information for display by the display means.

According to the second apparatus for editing displayed tree structures, the menu display means adds the tree structures with an edition menu which represents operations of selection, separation and connection to other object from respective objects and displays them on the screen of the display means. In this state, the operator operates the operation means based on the edition menu so as to input operational information which means selection, separation and connection to other object from respective objects on the screen of the display means. The connection means connects, when an object is separated, an index indicating a coordinate position on the screen of the operation means and the separated object to each other with a line. Besides, the display of the display means by the display drive means may be made so as to display an editing status in real time based on the input information instructed by the operator.

DESCRIPTION OF THE PREFERRED EMBODIMENTS

Embodiments of the present invention will be described in detail hereinafter with reference to the drawings.

Figure 1:
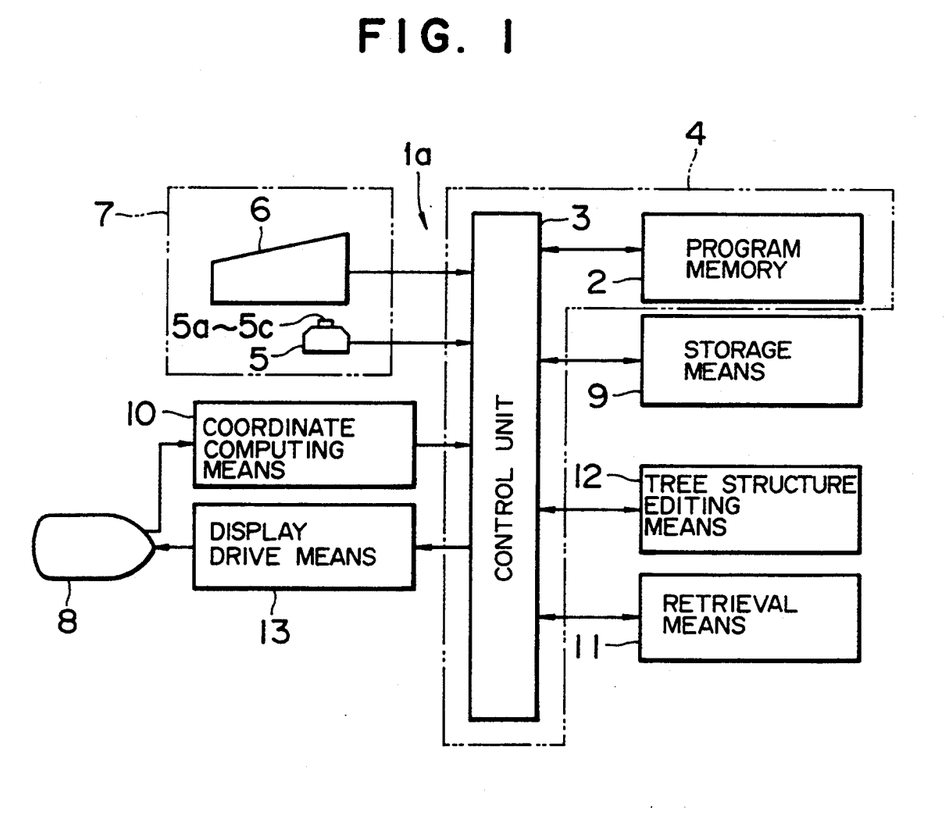
FIG. 1 is a block diagram showing a first embodiment of an apparatus for editing displayed tree structures according to the present invention.

An apparatus 1a for editing tree structures in display which is a first embodiment of the present invention shown in FIG. 1 is provided with control means 4 including a program memory 2 for storing operation programs of the whole apparatus 1a, a control unit (CPU) 3 for controlling the whole apparatus based on the operation programs, and operating means 7 including a keyboard 6 and a mouse 5 which is one of pointing devices connected to the control unit 3. The mouse 5 is provided with a selection button 5a for selecting an object, an addition button 5b for adding an object and a menu button 5c for selecting a menu. Also, a tablet, a track ball, an eye tracker, a stylus pen or the like may be used in place of the mouse 5.

Further, the apparatus 1a for editing tree structures in display is provided with display means 8, selected out of a CRT display, a liquid crystal display and the like, for displaying a picture image of the tree structures. Furthermore, there are provided, in the control unit 3 of the apparatus 1a, storage means 9 in which a plurality of tree structure information to be displayed on the screen of the display means 8, is stored coordinate computing means 10 for computing necessary coordinates on the screen in accordance with the operational information from the mouse 5, retrieval or search means 11 for retrieving one of the objects that has possibility to be a parent object of an object being moved, tree structure editing means 12 for editing new tree structure information related to selection, separation, move and connection to other object corresponding to the operational information based on the information computed by the coordinate computing means and also renewing tree structure information stored in the storage means 9 based on the result of editing corresponding to the operational information, and display drive means 13 for generating display pattern information in accordance with the information from the retrieval means 11 and the editing status of the tree structure editing means 12 and presenting the display pattern information to be displayed by the display means 8.

Figure 2:
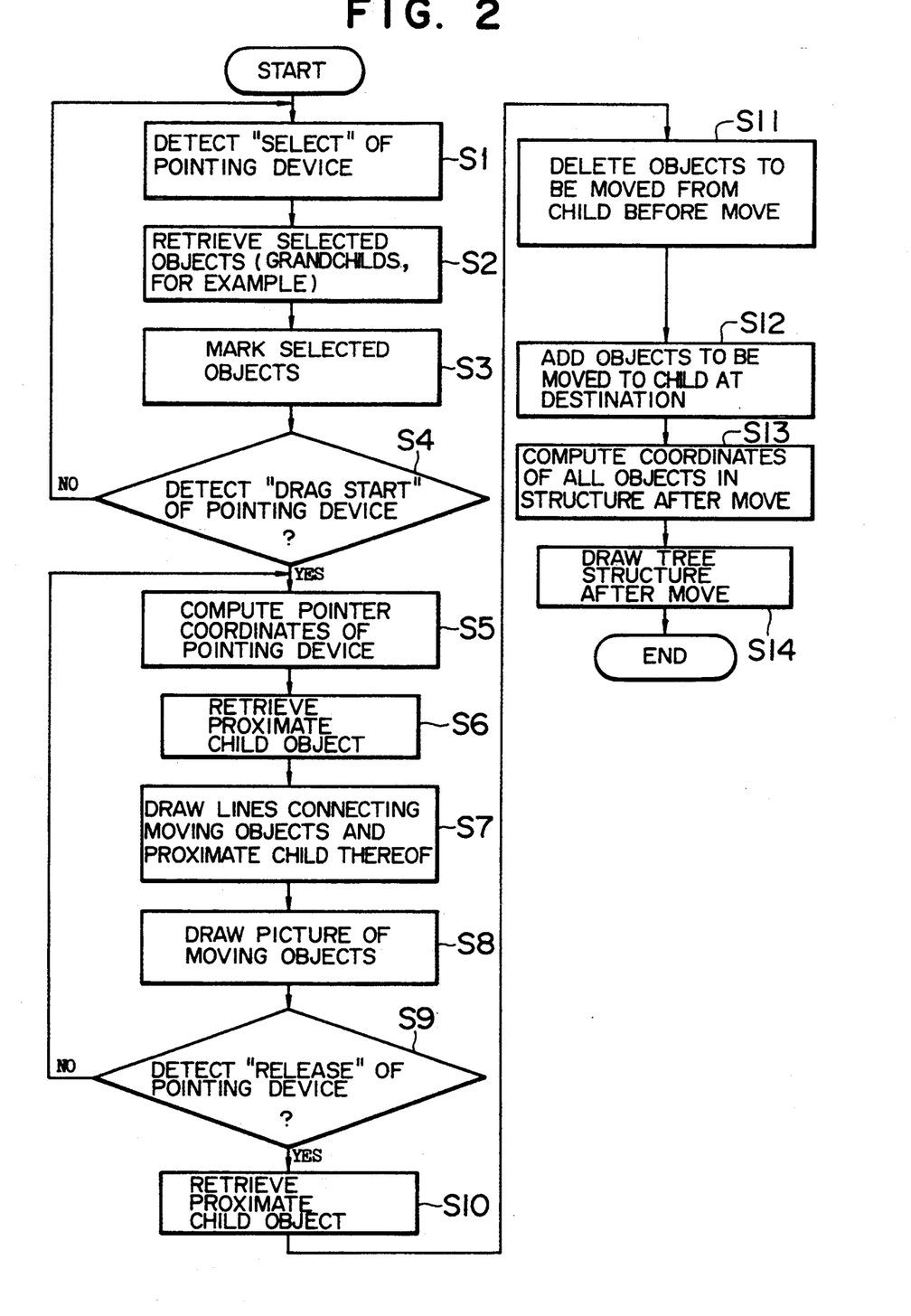
FIG. 2 is a flow chart showing the operation of the above apparatus for editing tree structures.
Figure 3:
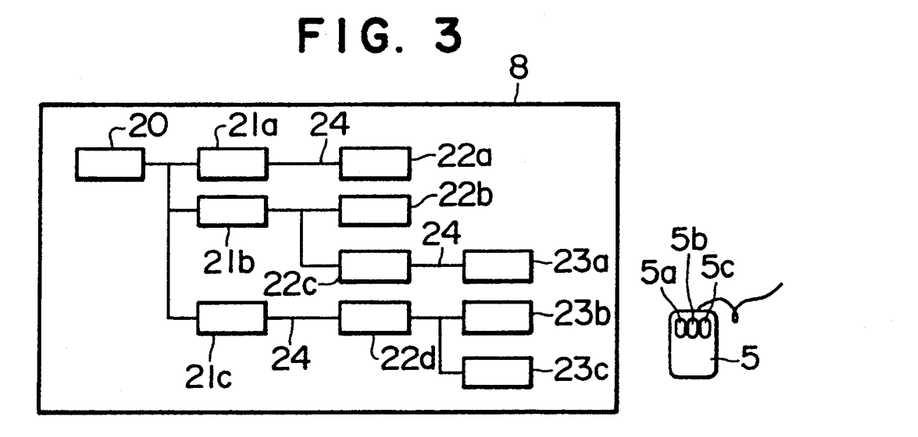
FIG. 3 shows display by the apparatus for editing tree structures in which tree structures to be edited at a stage before selecting an object are displayed with a pointing device.

Next, the operation of the apparatus 1a for editing tree structures in display will be described with reference to FIG. 2 and also to FIGS. 3 through 8. At the beginning, one root object 20, three parent objects 21a, 21b and 21c, four child objects 22a, 22b, 22c and 22d and three grandchild objects 23a, 23b and 23c are displayed in a state of being connected by branches 24, respectively, on the screen of the display means 8, and it is assumed that the grandchild objects 23b and 23c are connected in common to the child object 22d as shown in FIG. 3.

Description will be made hereinafter taking a case that the grandchild objects 23b and 23c are to be reconnected to the child object 22b from the above described state, as an example.

Figure 4:
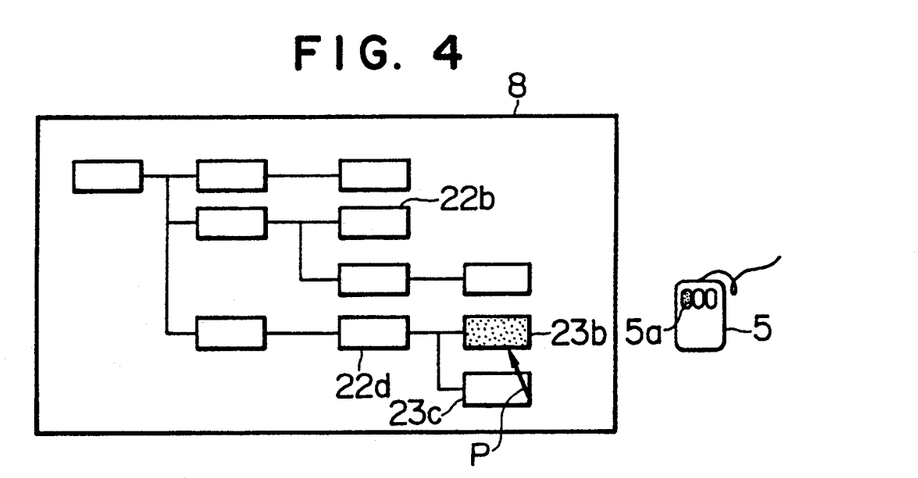
FIG. 4 shows the display together with the pointing device at a stage of selecting a first object.

First, as shown in FIG. 4, the mouse 5 is operated to move a pointer P thereof to the position of the grandchild object 23b on the screen, and the selection button 5a is depressed. The coordinate computing means 10 detects coordinates on the screen of the grandchild object 23b designated by the pointer P (S1, S2 in FIG. 2) by depression of the selection button 5a of the mouse 5, and sends the detected information to the control unit 3. With this operation, the tree structure editing means 12 performs marking (or coloring) of the object 23b which indicates that the grandchild object 23b has been selected under the control of the control unit 3, separates or disconnects the grandchild object 23b from the child object 22d, and sends the information to the display drive means 13 through the control unit 3. As a result, the display pattern is altered by the display drive means 13, and the grandchild object 23b is marked as shown in FIG. 4 for showing distinctly the fact that the object 23b is selected (S3).

Figure 5:
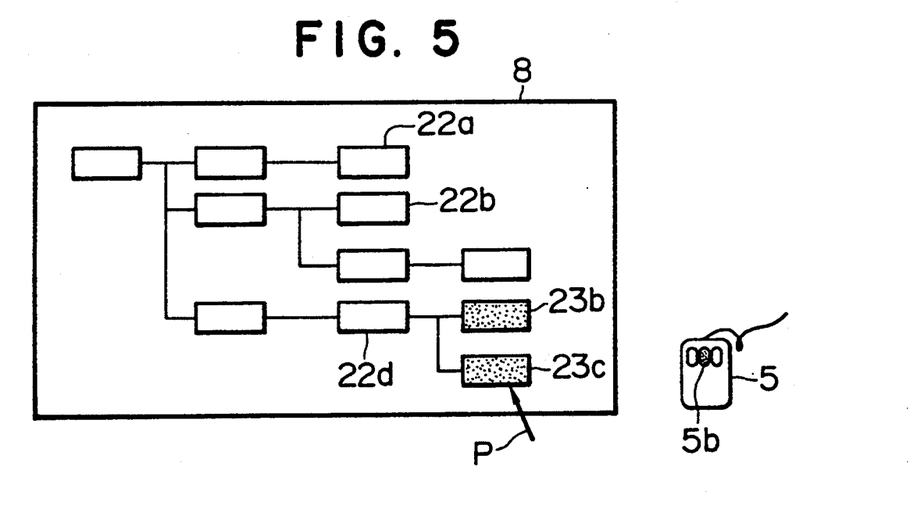
FIG. 5 shows the display together with the pointing device at a stage where a second object has been selected.
Figure 6:
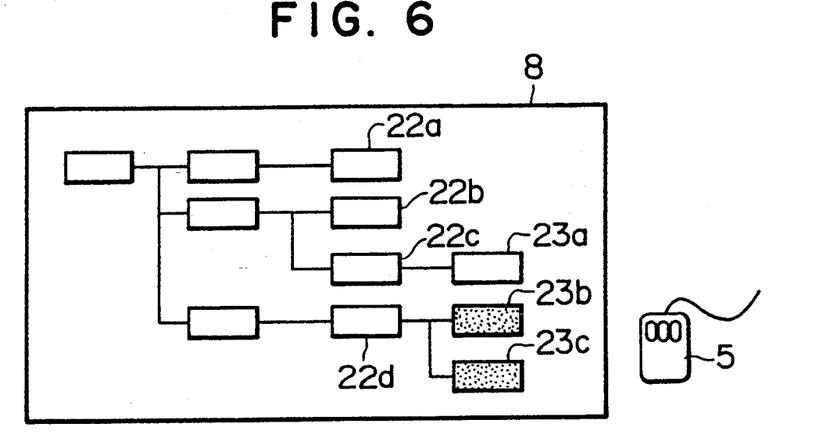
FIG. 6 shows the display together with the pointing device at a stage before two selected objects are moved.

Next, marking of the other grandchild object 23c is made similarly to the case described above in the operation of the addition button 5b. This state is shown in FIG. 5. Namely, the state of two grandchild objects 23b and 23c before move appears as shown in FIG. 6. Then, when movement (drag) of the pointer P of the mouse 5 is started, the start information is detected by the coordinate computing means 10 (S4), the coordinates of the pointer P are detected in accordance with the move thereof (S5), and the results of detection are sent to the retrieval means 11 and the tree structure editing means 12.

Figure 7:
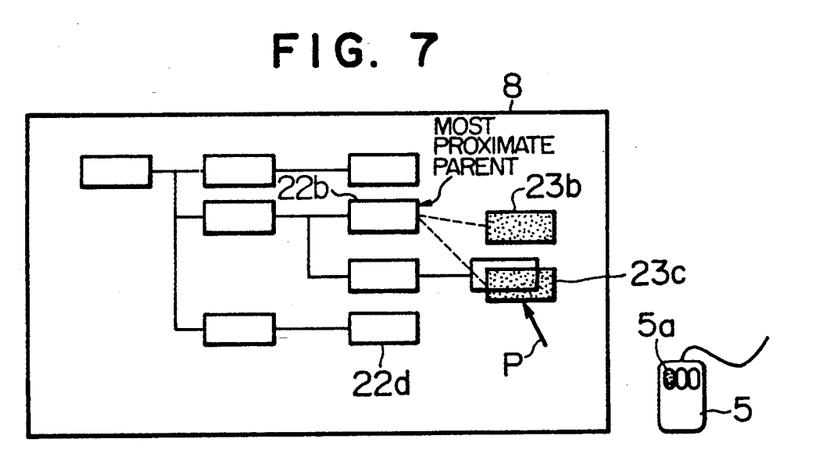
FIG. 7 shows the display together with the pointing device at a stage where two objects are being moved.

The retrieval means 11 retrieves the proximate child object 22b to which two grandchild objects 23b and 23c during move are to be connected based on the information detected by the coordinate computing means 10 (S6), and sends the results of retrieval to the display drive means 13. With this operation, the display drive means 13 generates display pattern information on lines (e.g. dotted lines) connecting two pieces of grandchild objects 23b and 23c during move and the proximate child object 22b to each other, and presents the display pattern information to be displayed by the display means 8. Two grandchild objects 23b and 23c during move are also displayed on the display means 8. As a result, a state that two grandchild objects 23b and 23c during move and the proximate child object 22b are connected with lines (dotted lines) to one another appears as shown in FIG. 7 (S7, S8).

Next, when release of the mouse 5 is detected (S9), the child object 22b proximate to pointer coordinates computed by the coordinate computing means 10 is retrieved again (S10). The tree structure editing means 12 deletes information of connection of two grandchild objects 23b and 23c with the child object 22d connected to them before move based on the above information (S11), edits to add connection of two grandchild objects 23b and 23c to the child object 22b at the destination (S12), further executes coordinate computation of all objects in the tree structures after move (S13), sends the results to the display drive means 13 through the control unit 3 and also renews the tree structure information stored in the storage means 9.

Figure 8:
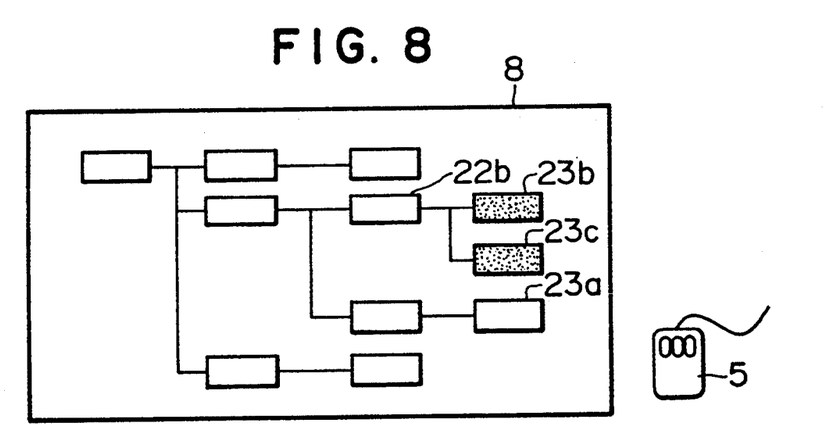
FIG. 8 shows the display together with the pointing device at a stage after two objects have been moved.

The display drive means 13 generates a display pattern of tree structures after move and presents the display pattern to be displayed by the display means 8. With this operation, tree structures after move in which the grandchild objects 23b and 23c are connected to the child object 22b are displayed by the display means 8 (S14) as shown in FIG. 8.

In such a manner, according to the present embodiment, it is possible to connect the moving grandchild objects 23b and 23c to the aimed child object 22b with a reduced steps of operation while watching these objects 23b and 23c all through their movement, thus making it possible to reduce intellectual labors of the operator.

Figure 9:
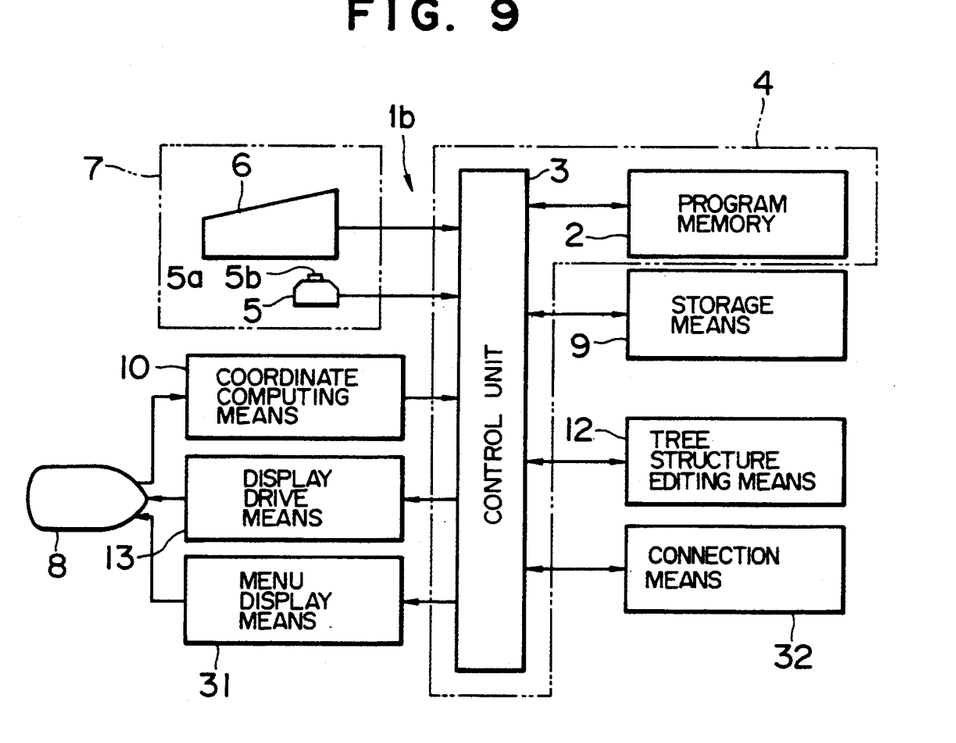
FIG. 9 is a block diagram showing a second embodiment of the apparatus for editing displayed tree structures according to the present invention.
Figure 10:
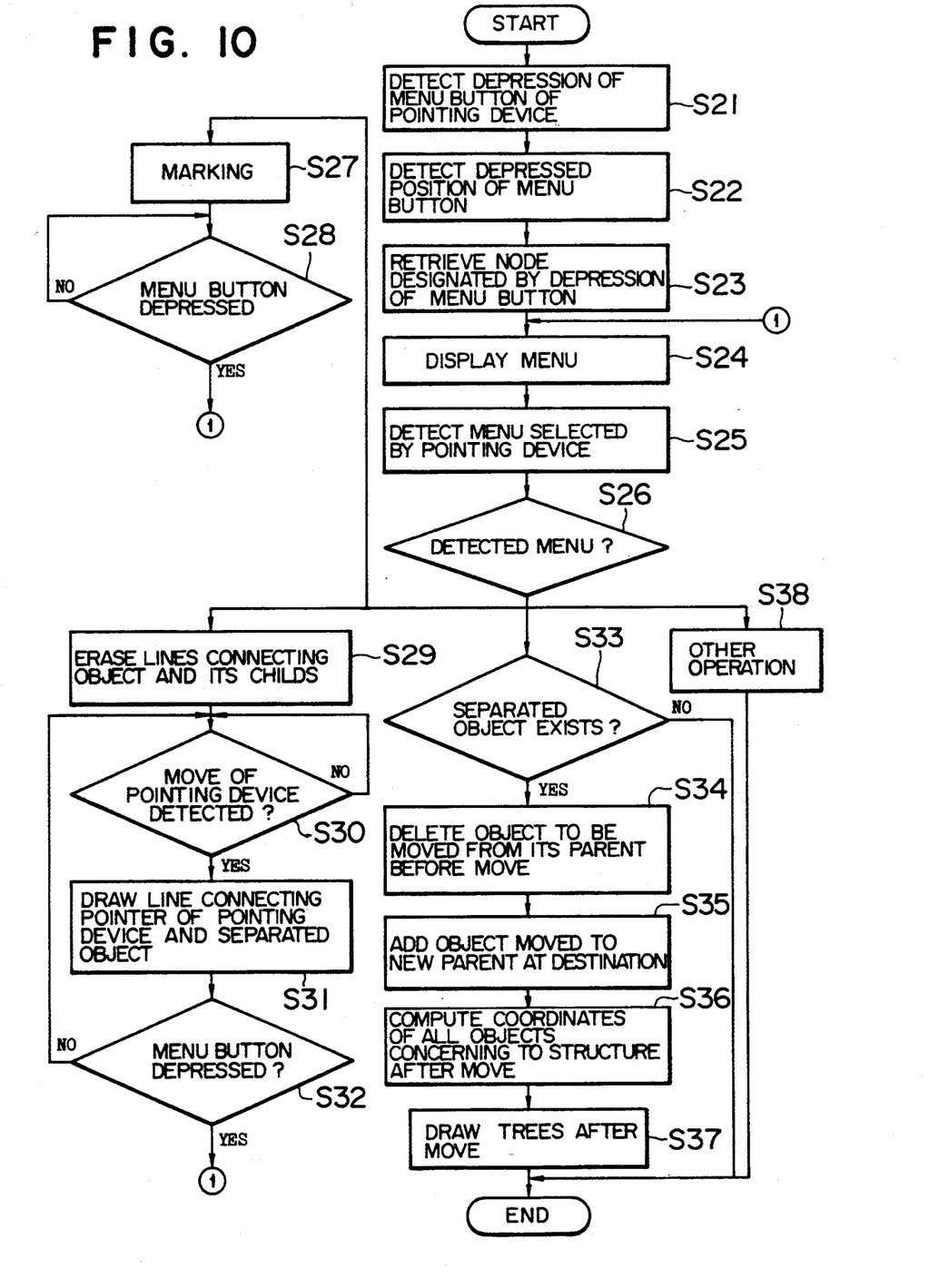
FIG. 10 is a flow chart showing the operation of the apparatus of FIG. 9.

Next, an apparatus for editing displayed tree structures which is a second embodiment of the present invention will be described with reference to FIG. 9 through FIG. 16. FIG. 9 is a block diagram of an apparatus 1b for editing tree structures in display which is the second embodiment of the present invention. What differs from the first embodiment in the present embodiment is the fact that the retrieval means 11 and the display of connection in dotted lines with the proximate object on the screen based on the retrieval means 11 are omitted, and menu display means 31 and connection means 32 are added in place thereof. The menu display means 31 displays on the screen an edition menu which represents operations of selection, separation, move, connection to other object of respective objects and edit of tree structures on the screen of the display means 8 in addition to the display of the tree structures. The connection means 32 connects a pointer (index) P on the screen showing a coordinate position of the mouse 5 to a separated object with a line when the object is disconnected from the tree structures. Since other parts of the structures are almost similar to those of the first embodiment shown in FIG. 1, the same reference numerals are affixed in FIG. 9 to those that have similar functions, thus omitting detailed description thereof.

The operation of the present embodiment will be described hereinafter with reference to a flow chart shown in FIG. 10 and FIGS. 11 through 16 taking a case that the grandchild objects 23b and 23c are to be moved and connected to the child object 22b similarly to the first embodiment as an example.

Figure 11:
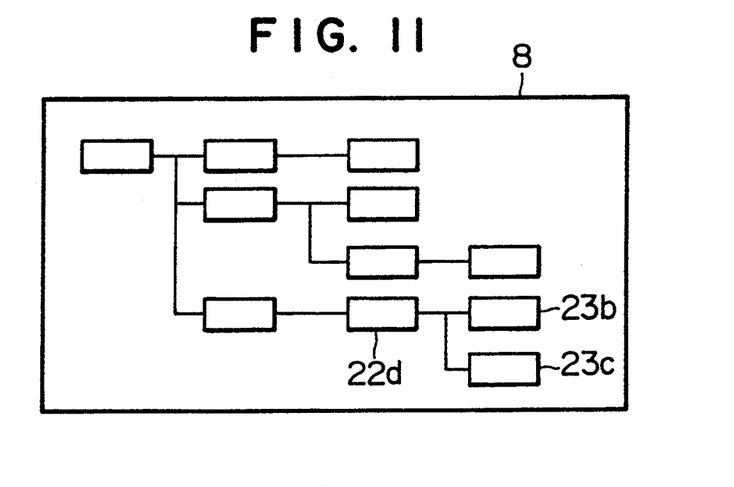
FIG. 11 shows the display by the apparatus for editing tree structures in which tree structures to be edited are displayed at a stage before selecting an object.
Figure 12:
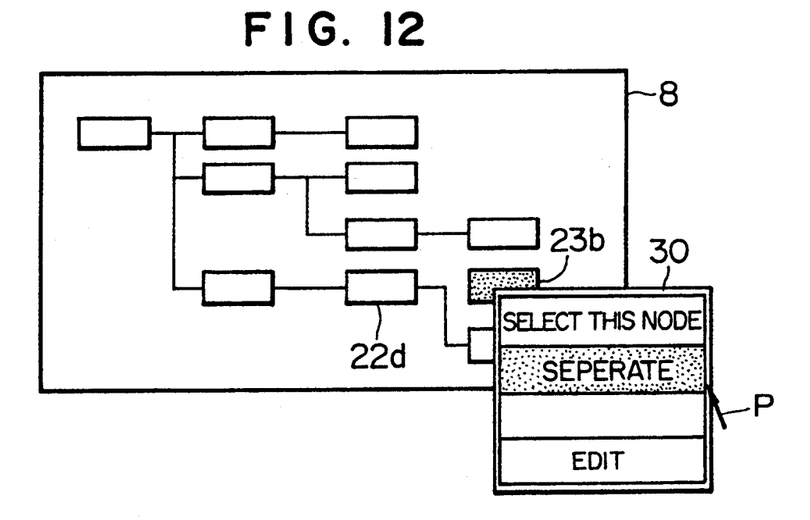
FIG. 12 shows the display in which tree structures and a menu are displayed at a stage of instructing separation of an object.

It is assumed that tree structures similar to those shown in FIG. 3 are displayed on the screen of the display means 8 at the beginning as shown in FIG. 11. First, when the mouse 5 is operated to move the pointer P to the position of the grandchild object 23b which is desired to be moved the menu button 5c is depressed, the depression of the menu button is detected (S21 in FIG. 10), the coordinates of the position where the menu button is depressed is detected (S22), a node indicating an object which the menu button is depressed to designate is retrieved (S23), and an edition menu 30 is displayed on the screen of the display means 8 as shown in FIG. 12 by the operation of the menu display means 31 (S24).

In this state, the tree structure editing means 12 detects the menu selected by the operator with the pointer P (S25), and determines the contents of the selected menu (S26). When "SELECT THIS NODE" is selected in step S26, a mark is affixed (coloring) to the grandchild object 23b as shown in FIG. 12 for distincting the selected object from the other objects (S27), and it is determined whether the menu button 5c has been depressed or not in step S28. When the mouse 5 is operated to move the position of the pointer P to a position out of any object or any branch and the menu button is depressed in step S28, the process is shifted to step S24 and a menu is displayed. Then, the position where any operation in the menu has been selected by the menu button is detected (S25), and further the contents of the detected operation in the menu is determined (S26).

Figure 13:
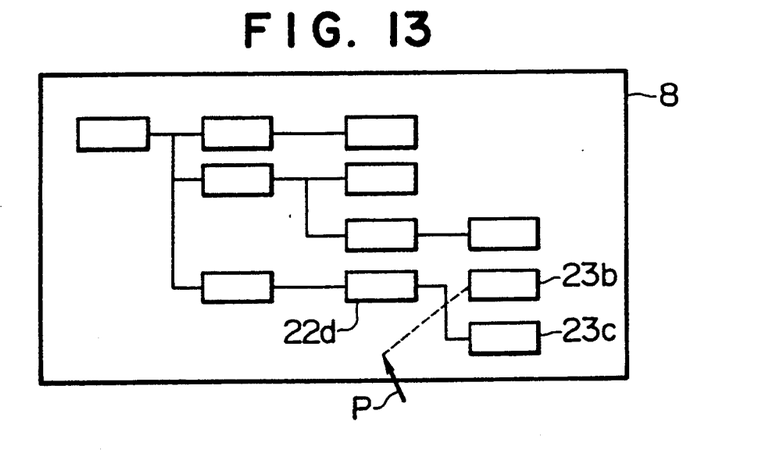
FIG. 13 shows the display at a stage after the object has been separated.
Figure 14:
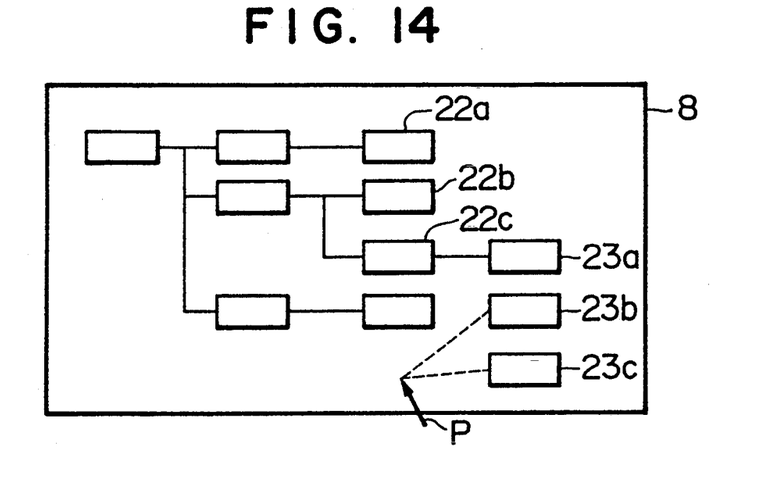
FIG. 14 shows the display at a stage after separation when two objects are separated.

When "SEPARATE FROM PARENT" of the menu is selected in step S26, the process is shifted to step S29, where a line (a branch 24) connecting the grandchild object 23b and the child object 22d is deleted, furthermore, the move of the pointer P is detected (S30), and a line (a dotted line) connecting the pointer P and the separated grandchild object 23b is drawn by the connection means 32 as shown in FIG. 13. Then, the process is shifted to step S32, where it is determined whether the menu button 5c has been depressed or not. Here, when similar operation is also performed with respect to the second grandchild object 23c, the display of the display means shows a state that the pointer P and two grandchild objects 23b and 23c are connected with dotted lines as shown in FIG. 14.

Figure 15:
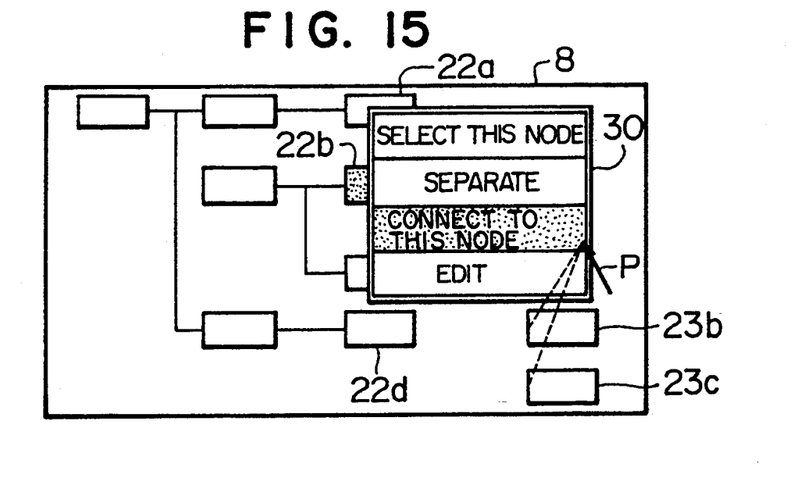
FIG. 15 shows the display in which tree structures and the menu are displayed at a stage of connecting two objects to the object of the destination.
Figure 16:
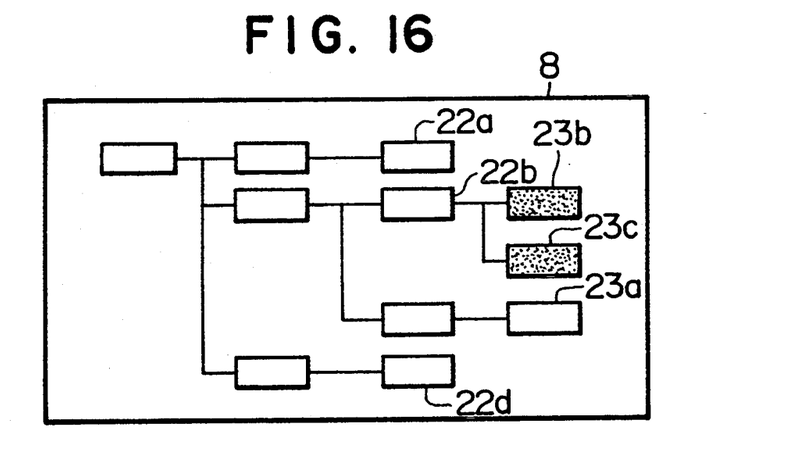
FIG. 16 shows the display at a stage after two objects are moved.

When the menu button 5c is depressed in step S32 after separating two grandchild objects 23b and 23c from the child object 22d in such a manner as described above, the process is shifted to step S24 and a menu is displayed. Then, the position where an operation in the menu has been selected by the menu button is detected (S25), and the content of the detected operation is determined (S26). Besides, it may be arranged so that, by selecting "SEPARATE" in the menu, the node is also selected at the same time. With this arrangement, "SELECT THIS NODE" and "SEPARATE FROM PARENT" may be carried out through one selecting operation. When "CONNECT TO THIS NODE" is selected at the position of the child object 22b by means of the pointer P in step S26 as shown in FIG. 15, the process is shifted to step S33, where it is determined whether the separated objects exist or not. Since separated objects 23b and 23c exist in this case, information of two grandchild objects 23b and 23c is deleted from the child object 22d before move (S34), editing to add the information of two grandchild objects 23b and 23c to the child object 22b at the destination is performed (S35), coordinate computation of all the objects of the tree structures after move is carried out (S36) further and these results are sent to the display drive means 13. The display drive means 13 generates a display pattern of new tree structures after move and presents the display pattern to be displayed by the display means 8. Thus, as shown in FIG. 16, tree structures after move in which the grandchild objects 23b and 23c are connected to the child object 22b are displayed by the display means 8 (S31). Besides, when it is determined in step S33 that there is no separated object, the processing is terminated.

In such a manner, according to the present embodiment, it is possible to connect the grandchild objects 23b and 23c to the aimed child object 22b with reduced steps of operation and moreover while referring to the edition menu, intellectual labors are reduced.

Besides, it is also possible to have other processing performed by selecting other operation with the menu (S36) after step S26.

The present invention is not limited to the embodiments described above, but various modifications can be made within the scope of the gist thereof. For example, a case that grandchild objects are moved has been described in the above-described two embodiments, but child objects may be moved instead. In this case, when a grandchild object belongs to the child object, the grandchild object is also moved together with the child object. Further, a proximate child has been selected as an object to be connected, but it is not limited thereto, and the object to be connected may be selected based on the coordinate position, move speed or the like of the pointer.

As described in detail above, according to the present invention, it is possible to connect a moving object to an aimed object by reduced steps of operation while watching a moving all the way or while watching an edition menu. Thus, it is possible to provide an apparatus for editing tree structures in display which is able to reduce intellectual efforts of an operator.

We claim:

1. An apparatus for editing displayed tree structures including a plurality of objects and branches connecting respective objects to another object, comprising:

display means having a display screen for displaying said tree structures thereon;

storage means for storing information regarding the tree structures;

operating means for inputting an operational information including selection of one object to be treated from objects displayed on said display screen, separation, move of said object and connection of said object to another object;

coordinate computing means for computing coordinates on said display screen in accordance with said inputted operational information;

searching means for searching and retrieving one object that has a possibility to be a parent of said selected object;

editing means for editing tree structure information stored in said storage means corresponding to said inputted operational information based on said computed coordinate and renewing the stored tree structure information based on the edited tree structure information; and display drive means for generating display pattern information displaying a line which connects said selected object to said retrieved parent object in accordance with the information on said retrieved parent object and a stage of editing in said editing means and supplying the display pattern information to said display means so as to display said connecting line.

2. The apparatus for editing displayed tree structures according to claim 1, further comprising demarcation means for visually demarcating said selected object.

3. The apparatus for editing displayed tree structures according to claim 2, wherein said demarcation means marks said selected object.

4. The apparatus for editing displayed tree structures according to claim 2, wherein said demarcation means deletes the connecting line for connecting said selected object to a parent object thereof.

5. An apparatus for editing displayed tree structures including a plurality of objects and branches which connect respective objects to other objects, comprising:

display means having a display screen for displaying said tree structures and an operation menu showing operational informations including selection of an object to be treated from other objects in said tree structures, separation and move of said selected object from a parent object thereof, and connection of said selected object to another object;

storage means for storing information on the tree structures;

menu display means for displaying said operation menu in addition to said displayed tree structures on said display screen;

operating means for inputting operational information based on said displayed operation menu;

coordinate computing means for computing coordinates on said screen in accordance with said inputted operational information;

connection means for generating information on a connecting line for connecting an index indicating the position of said coordinates on the screen and said selected object disconnected from said parent object;

editing means for editing tree structure information stored in said storage means corresponding to said inputted operational information based on said computed coordinates and renewing the stored tree structure information based on said edited tree structure information; and display drive means for generating display pattern information in accordance with the information on said connecting line and a stage of editing in said editing means and supplying the display pattern information to said display means so as to display said connecting line.

6. The apparatus for editing displayed tree structures according to claim 5, further comprising demarcation means for visually demarcating said selected object.

7. The apparatus for editing displayed tree structures according to claim 6, wherein said demarcation means marks said selected object.

8. The apparatus for editing displayed tree structures according to claim 6, wherein said demarcation means deletes a connecting line for connecting said selected object and the parent object thereof to each other.

9. A method of editing displayed tree structures including a plurality of objects and branches for connecting respective objects to others while displaying the tree structures, comprising the steps of:

storing information on tree structures;

displaying said tree structures together with a pointer on a display screen;

displaying, after an object to be separated is selected from said displayed tree structures, said selected object in accordance with said pointer on the screen;

searching for and retrieving an object which has a possibility of being a parent located at a nearest position to said selected moving object;

displaying a connecting line for connecting said retrieved parent object to said selected object;

editing said tree structure information after said parent object to which said selected object is to be connected is determined, based on said selected object and said parent object, and renewing records of said tree structure information in a memory based on results of editing; and displaying new tree structures obtained based on said renewed tree structure information.

10. A method of editing displayed tree structures including a plurality of objects and branches for connecting respective objects to others, comprising the steps of:

storing information about tree structures;

displaying said tree structures and a pointer on a display screen;

deleting, when an object to be separated is selected from said displayed tree structures, display of a connecting line connected to said selected object and the parent object thereof and displaying an operation menu showing operational informations including selection, separation, move and connection to another object of an object selected to be separated from said tree structures on said display screen;

displaying a connecting line for connecting said pointer and said selected object to each other when move operation is selected;

moving said connecting line connected to said pointer on said display screen in accordance with said pointer;

inputting information on a designated parent object to which said selected object is to be connected;

editing said tree structure information based on results of operation and renewing records of said tree structure information in a memory based on results of editing; and displaying new tree structures based on said renewed tree structure information.

* * * * *